United States Patent
Kikuchi et al.

(10) Patent No.: US 7,490,943 B2
(45) Date of Patent: Feb. 17, 2009

(54) COLORED ANTI-FOG MIRROR

(75) Inventors: Hideyuki Kikuchi, Fujieda (JP);
Masatoshi Nakamura, Fujieda (JP)

(73) Assignee: Murakami Corporation, Shizuoka-shi (JP)

( * ) Notice: Subject to any disclaimer, the term of this patent is extended or adjusted under 35 U.S.C. 154(b) by 129 days.

(21) Appl. No.: 11/695,296

(22) Filed: Apr. 2, 2007

(65) Prior Publication Data
US 2007/0247713 A1  Oct. 25, 2007

(30) Foreign Application Priority Data
Apr. 19, 2006  (JP) ............... 2006-115628

(51) Int. Cl.
*G02B 1/00* (2006.01)
(52) U.S. Cl. ..................................... 359/507
(58) Field of Classification Search ................. 359/507, 359/512, 513, 514, 584, 585, 588, 883, 884, 359/603, 589
See application file for complete search history.

(56) References Cited

U.S. PATENT DOCUMENTS 6,425,670 B1 * 7/2002 Komatsu et al. ............ 359/507
6,781,738 B2 * 8/2004 Kikuchi et al. ............. 359/265
2006/0077549 A1  4/2006 Kikuchi et al.

FOREIGN PATENT DOCUMENTS

| EP | 1 099 671 A1 | 5/2001 |
| EP | 1 623 657 A1 | 2/2006 |
| JP | 62-114836 | 7/1987 |
| JP | 4-128803 | 4/1992 |
| JP | 3021072 | 11/1995 |
| JP | 2001-141916 | 5/2001 |
| WO | WO 98/39262 | 9/1998 |

OTHER PUBLICATIONS

U.S. Appl. No. 11/695,296, filed Apr. 2, 2007, Kikuchi, et al.

* cited by examiner

*Primary Examiner*—Euncha P Cherry
(74) *Attorney, Agent, or Firm*—Oblon, Spivak, McClelland, Maier & Neustadt, P.C.

(57) ABSTRACT

A colored anti-fog mirror that emits reflected light in response to incident light, the colored anti-fog mirror comprising a substrate, a hydrophilic functional layer containing a photocatalytic substance, and a metallic reflecting film provided between the substrate and the hydrophilic functional layer, wherein a material of the metallic reflecting film and a thickness of the hydrophilic functional layer are set such that the reflected light has a spectral reflection spectrum having a maximum reflectance in the visible region over 510 nm and not more than 600 nm.

20 Claims, 10 Drawing Sheets

COLORED ANTI-FOG MIRROR

CROSS-REFERENCE TO RELATED APPLICATION

The disclosure of Japanese Patent Application No. JP2006-115628 filed on Apr. 19, 2006 including the specification, drawings and abstract is incorporated herein by reference in its entirety.

BACKGROUND OF THE INVENTION

1. Field of the Invention

The present invention relates to a colored anti-fog mirror.

2. Related Background of the Invention

Conventionally, halogen lamps have been used as vehicle headlights for automobiles and the like. The light emitted from a halogen lamp has a relatively weak light intensity in a short-wavelength bluish wavelength region, but a relatively strong light intensity in a yellow-to-red long wavelength region, for example around 800 nm.

If reflected light from a vehicle mirror excessively enters the eyes of a driver, then the driver is dazzled and is liable to get tired eyes.

To resolve this problem, as a vehicle mirror for coping with light from halogen lamp vehicle headlights, there has been developed a vehicle mirror using a colored anti-fog mirror whose mirror surface is colored blue, which is a complimentary color to yellow-red (see, for example, Japanese Patent Application Laid-open No. 2001-141916). This colored anti-fog mirror absorbs light in the yellow-red wavelength region, enabling the reflectance of light in this wavelength region to be reduced. As a result, the glare-reducing performance for reflected light from a vehicle mirror comprising the colored anti-fog mirror can be improved, and moreover visibility, in particular night visibility, can be improved.

Meanwhile, vehicle headlights comprising discharge lamps having a higher brightness than halogen lamps have become widespread in recent years. In contrast to halogen lamps, discharge lamps have an emission spectrum (bright line spectrum) over the whole visible region. If a vehicle mirror is made to absorb light in a specific wavelength region as in the case of the countermeasure against halogen lamps, then the reflected light for a discharge lamp thus becomes more intense in regions other than this specific wavelength region. For example, if the vehicle mirror is colored blue, then the reflected light from the mirror will have an amplified blue color. Such bluish reflected light dazzles people more than light of other colors. That is, a blue-colored vehicle mirror cannot be said to have an adequate anti-dazzle performance for discharge lamps.

Examples of mirrors that reduce reflected light in a specific wavelength region such as blue, i.e. short-wavelength, light are those described in Japanese Registered Utility Model No. 3021072, Japanese Utility Model Application Laid-open No. 62-114836, and Japanese Patent Application Laid-open No. 4-128803. For example, in Japanese Registered Utility Model No. 3021072, with the intention of providing an anti-dazzle mirror that enables glare to be reduced while maintaining visibility, there is proposed an anti-dazzle mirror having a first Cr film or $Cr_2O_3$ film that is formed on an upper surface of glass, a metal film that is formed on an upper surface of the first Cr film or $Cr_2O_3$ film and has a reflectance for a blue component out of three primary color components of light lower than the reflectance for the other color components, and a second Cr film that is formed on an upper surface of the metal film.

SUMMARY OF THE INVENTION

However, for the conventional mirrors described in Japanese Registered Utility Model No. 3021072, Japanese Utility Model Application Laid-open No. 62-114836, and Japanese Patent Application Laid-open No. 4-128803, as is clear, for example, from FIG. 3 in Japanese Registered Utility Model No. 3021072 and FIG. 2 (2-1) in Japanese Patent Application Laid-open No. 4-128803, the reflectance at wavelengths of approximately 400 nm to 700 nm has a maximum value at a wavelength greater than 650 nm. When reflecting a halogen lamp, the mirror surface will thus clearly become reddish, and hence it will not be possible to secure adequate visibility. Moreover, for the conventional mirrors described in Japanese Registered Utility Model No. 3021072, Japanese Utility Model Application Laid-open No. 62-114836, and Japanese Patent Application Laid-open No. 4-128803, it has been ascertained that in the case of using during wet weather or in a humid location, the surface of the mirror fogs up due to water droplets become attached thereto, and hence the visibility is reduced.

The present invention has thus been devised in view of the above state of affairs; it is an object of the present invention to provide a colored anti-fog mirror that exhibits adequate visibility and glare-reducing performance for reflected light from either halogen lamps or discharge lamps for people of a wide range of ages, and moreover has adequate anti-fog performance when used during wet weather or in a humid location.

To achieve the above object, the present inventors first provided a hydrophilic functional layer as an outermost layer of a colored anti-fog mirror. As a result, the colored anti-fog mirror could be given adequate anti-fog performance. However, due to the provision of the hydrophilic functional layer, reflected light from a metallic reflecting film and reflected light from the colored anti-fog mirror no longer have the same spectral reflection spectrum. Furthermore, if the thickness of the hydrophilic functional layer is changed, then the spectral reflection spectrum of the colored anti-fog mirror changes. Moreover, if the mirror surface is either bluish or reddish, then the above object can no longer be achieved. The present inventors carried out further assiduous studies, and as a result discovered that by setting the material of the metallic reflecting film and the thickness of the hydrophilic functional layer such that reflected light from the colored anti-fog mirror has a spectral reflection spectrum that satisfies specified conditions in the visible region, the mirror surface does not become bluish or reddish with either halogen lamps or discharge lamps, and hence the above object can be achieved.

The present invention provides a colored anti-fog mirror that reflects incident light to emit reflected light, the colored anti-fog mirror comprising a substrate, a hydrophilic functional layer containing a photocatalytic substance, and a metallic reflecting film provided between the substrate and the hydrophilic functional layer, wherein a material of the metallic reflecting film and a thickness of the hydrophilic functional layer are set such that the reflected light has a spectral reflection spectrum having a maximum reflectance in the visible region over 510 nm and not more than 600 nm.

According to this colored anti-fog mirror, adjustment is carried out such that the maximum reflectance in the visible region appears in a wavelength range over 510 nm and not more than 600 nm, whereby the light intensity in a reddish long wavelength region can be reduced when a halogen lamp shines thereon. When a discharge lamp shines thereon, the light intensity in the reddish long wavelength region can be reduced, and moreover the reflected light in a strongly blue short wavelength region can also be reduced. As a result, for the colored anti-fog mirror of the present invention, adequate visibility and glare-reducing performance can be secured even for elderly people who are particularly prone to being dazzled by the reflected light. Consequently, in the case of using the colored anti-fog mirror of the present invention as vehicle rear view mirror, even in the case that a following vehicle equipped with halogen lamps or discharge lamps approaches at night, the colored anti-fog mirror is able to exhibit adequate visibility and glare-reducing effects against these lamps, and hence driving safety can be improved.

Moreover, in the present invention, due to the hydrophilicity of the hydrophilic film containing the photocatalytic substance, water droplets that become attached to the surface of the anti-fog mirror spread out into a thin film, and hence excellent anti-fog performance can be obtained. Furthermore, even in the case that organic contaminant that would reduce the hydrophilic function becomes attached to the surface of the anti-fog mirror, the attached organic contaminant is decomposed by the photocatalytic action of the photocatalytic substance in the hydrophilic functional layer. A reduction in the hydrophilic function of the hydrophilic functional layer can thus be adequately inhibited. As a result, even in wet weather or the like, water droplets that become attached to the surface of the colored anti-fog mirror of the present invention can be turned into a water film, and hence adequate visibility can be secured, whereby safety is improved.

Furthermore, in the case that the colored anti-fog mirror of the present invention is used as a vehicle mirror, even in the case that sunlight is reflected by the mirror, the degree of discomfort felt is less than with a conventional mirror. In the case that the colored anti-fog mirror is used as a vehicle mirror, it is generally at dawn and dusk that sunlight is incident on the mirror, the sunlight being colored red at this time. Because the colored anti-fog mirror of the present invention is able to reduce reflected light in the reddish long wavelength region, even in the case that sunlight is reflected by the mirror, the extent of discomfort felt is less than with a conventional mirror.

Moreover, the distance between the metallic reflecting film and the mirror surface which could cause a double image is short, and hence a double image perceptible to the human eye can be prevented. Furthermore, the hydrophilic functional layer has all of an optical interference action, a hydrophilic action and a photocatalytic action, whereby the structure of the colored anti-fog mirror can be simplified and accompanying this, the manufacturing process can be simplified, and hence the cost can be reduced.

In the colored anti-fog mirror of the present invention, the hydrophilic functional layer preferably comprises a hydrophilic film containing a hydrophilic substance, and a photocatalytic film containing a photocatalytic substance provided on the metallic reflecting film side of the hydrophilic film. Through the hydrophilic film containing the hydrophilic substance being provided in the hydrophilic functional layer, to which raindrops and the like may become attached, the colored anti-fog mirror is able to exhibit adequate anti-fog performance and visibility. Moreover, even in the case that organic contaminant that would reduce the hydrophilic function becomes attached to the colored anti-fog mirror, the attached organic contaminant is decomposed by the photocatalytic action of the photocatalytic substance, and hence excellent durability is exhibited. By separately providing the hydrophilic film exhibiting the high anti-fog performance and so on, and the photocatalytic film exhibiting the high durability and so on, the colored anti-fog mirror is able to exhibit the properties and actions of these films at a yet higher level, and hence good anti-fog performance can be maintained over a prolonged period of time.

In the colored anti-fog mirror of the present invention, preferably, the hydrophilic substance comprises silicon dioxide, and the photocatalytic substance comprises titanium dioxide. Among substances having a hydrophilic action, silicon dioxide has excellent wear resistance and scratch resistance, and hence the colored anti-fog mirror will not only exhibit excellent anti-fog performance and visibility, but moreover will have improved wear resistance and scratch resistance.

Moreover, the metallic reflecting film preferably has a spectral reflection spectrum in which the reflectance increases monotonically from short wavelength to long wavelength over the whole visible region. A colored anti-fog mirror of the present invention having such a metallic reflecting film is able to exhibit a spectral reflection spectrum having a maximum reflectance in a desired wavelength region for a broad range of thicknesses of the hydrophilic functional layer. Moreover, even in the case that the thickness of the hydrophilic functional layer varies, there will be little variation in the color of the mirror surface. The production reliability of the colored anti-fog mirror can thus be further improved, and moreover the visibility and glare-reducing performance will be excellent over the whole of the mirror surface.

From a similar viewpoint, the reflectance of the metallic reflecting film with a thickness of 60 nm preferably varies by not more than 20% over a wavelength region from 400 nm to 800 nm. Note that at a thickness of approximately 45 nm and above, the reflectance of the metallic reflecting film becomes almost independent of the thickness. For example, for a metallic reflecting film made of Ti or Nb, at a thickness of less than 45 nm, the reflectance tends to increase as the thickness increases, but at a thickness of 45 nm and above, the reflectance hardly changes upon the thickness being changed.

In the colored anti-fog mirror of the present invention, the metallic reflecting film preferably comprises titanium and/or niobium. A metallic reflecting film comprising such a metal has a reflectance in a suitable range. A reduction in contrast of a reflected image which would be caused by excessively high reflectance can thus be suppressed. Moreover, in the case of the reflectance being too high, to give the reflected image contrast, there are cases in which the metallic reflecting film is made thin so as to be made into a so-called half mirror that does not reflect but rather transmits some of the incident light. For the colored anti-fog mirror of the present invention, because the reflectance is in a suitable range, the need to make into a half mirror can be further reduced.

Moreover, such a metallic reflecting film has a spectral reflection spectrum in which the reflectance increases monotonically from short wavelength to long wavelength over the whole visible region. As a result, even in the case, for example, that the thickness of the metallic reflecting film itself or the thickness of the hydrophilic functional layer varies from place to place, excellent visibility and glare-reducing performance can be exhibited over the whole of the mirror surface. Moreover, even in the case that the thickness of the metallic reflecting film itself or the thickness of the hydrophilic functional layer varies between products, the visibility and glare-reducing performance can be adequately improved for all of the products, and hence the production stability will be excellent. Furthermore, titanium and niobium have excellent corrosion resistance, chemical resistance to acids, alkalis and so on, and durability, and hence even if the colored anti-fog mirror is used under relatively harsh conditions such as in the case of an automobile side mirror, high performance can be maintained over a prolonged period of time.

The colored anti-fog mirror of the present invention is preferably used as a vehicle mirror. A vehicle mirror is used in an environment prone to being exposed to rain or humidity. Accordingly, if the colored anti-fog mirror of the present invention is used as a vehicle mirror, then the hydrophilicity and anti-fog performance of the colored anti-fog mirror can be exhibited yet more effectively, and the excellent visibility and glare-reducing performance can be exhibited effectively.

According to the present invention, there can be provided a colored anti-fog mirror that exhibits adequate visibility and glare-reducing performance for reflected light from either halogen lamps or discharge lamps for people of a wide range of ages, and moreover has adequate anti-fog performance when used during wet weather or in a humid location.

DESCRIPTION OF THE PREFERRED EMBODIMENTS

Figure 1:
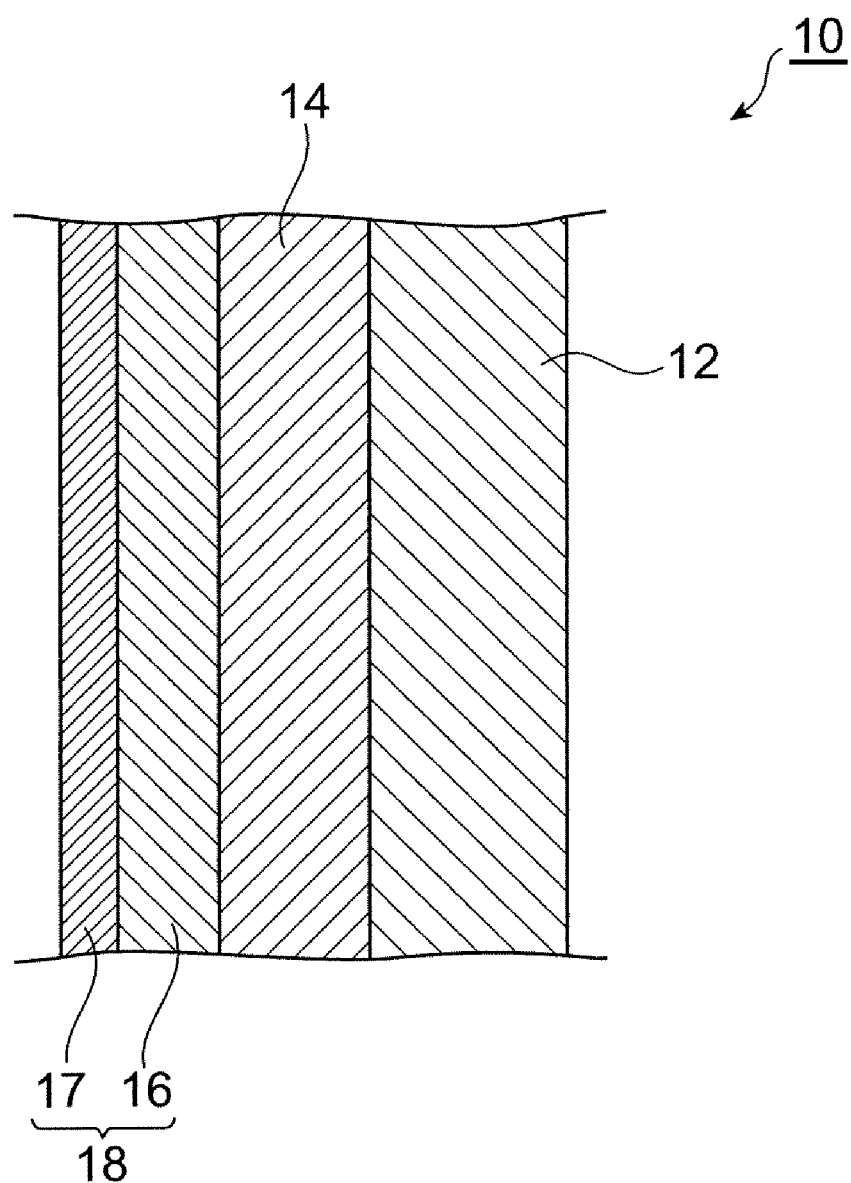
FIG. 1 is a schematic sectional view showing a colored anti-fog mirror according to a first embodiment.

Following is a detailed description of preferred embodiments of the present invention, with reference to the drawings as required. Note that in the drawings, elements that are the same as one another are designated by the same reference numeral, and redundant repeated description is omitted. Moreover, unless otherwise stated, positional relationships such as above, below, left, and right are based on the positional relationships shown in the drawings. Furthermore, dimensional ratios are not limited to those shown in the drawings.

FIG. 1 is a schematic sectional view showing a colored anti-fog mirror according to a preferred first embodiment of the present invention. The colored anti-fog mirror 10 shown in FIG. 1 comprises a substrate 12, a hydrophilic functional layer 18, and a metallic reflecting film 14 provided between the substrate 12 and the hydrophilic functional layer 18. In FIG. 1, the substrate 12, the metallic reflecting film 14, and the hydrophilic functional layer 18 are laminated together in this order. Furthermore, the hydrophilic functional layer 18 comprises a photocatalytic film 16 and a hydrophilic film 17, which are made of different materials to one another, or are formed in different film formation stages.

The material of the metallic reflecting film 14 and the thickness of the hydrophilic functional layer 18 are set such that reflected light from the colored anti-fog mirror 10 has a spectral reflection spectrum having a maximum reflectance in the visible region over 510 nm and not more than 600 nm.

The substrate 12 is, for example, a substrate formed from glass. The substrate 12 may alternatively be formed from a resin. Moreover, the substrate 12 may also be one comprising a plurality of substrates laminated together.

The metallic reflecting film 14 is a reflecting film comprising a metal formed on a surface of the substrate 12. The material of the metallic reflecting film 14 is set in combination with the thickness of the hydrophilic functional layer 18, described below, such that reflected light from the colored anti-fog mirror 10 has a spectral reflection spectrum having a maximum reflectance in the visible region over 510 nm and not more than 600 nm, preferably between 515 nm and 570 nm, more preferably between 525 nm and 540 nm. This material may be a single metal, or an alloy, or steel containing a small amount of carbon. Specifically, examples are at least one metal selected from the group consisting of aluminum (Al), titanium (Ti), chromium (Cr), nickel (Ni), niobium (Nb), molybdenum (Mo), palladium (Pd), silver (Ag) and platinum (Pt), and/or stainless steel.

Of these, from the viewpoint of improving chemical resistance and corrosion resistance, at least one metal selected from the group consisting of titanium, chromium, nickel, niobium, molybdenum, palladium and platinum is preferable.

The metallic reflecting film 14 may comprise a plurality of metallic films made of different materials to one another laminated together, or a plurality of metallic films formed at different laminating stages to one another laminated together.

Moreover, from the viewpoint of giving the colored anti-fog mirror 10 a spectral reflection spectrum having a maximum reflectance in the desired wavelength region for a broad range of thicknesses of the hydrophilic functional layer 18, at least one metal selected from the group consisting of titanium, nickel, niobium, palladium and platinum, and/or stainless steel is preferable. If such a metal is used as the material of the metallic reflecting film 14, then the production reliability of the colored anti-fog mirror 10 can be improved. Moreover, the colored anti-fog mirror 10 is able to exhibit improved visibility and glare-reducing performance over the whole of the mirror surface. Furthermore, from the viewpoint of preventing the colored anti-fog mirror 10 from becoming a half mirror, at least one metal selected from the group consisting of titanium and niobium, and/or stainless steel is preferable, and considering corrosion resistance, titanium and/or niobium is particularly preferable. A colored anti-fog mirror 10 using titanium and/or niobium not only enables the object of the present invention (with regard to visibility, glare-reducing performance, and anti-fog performance) to be achieved adequately, but moreover is also improved with regard to corrosion resistance, chemical resistance, and prevention from becoming a half mirror. This is particularly preferable in the case of use as a vehicle mirror for an automobile or the like, especially an external rear view mirror that is prone to being exposed to rain and the like.

Figure 2:
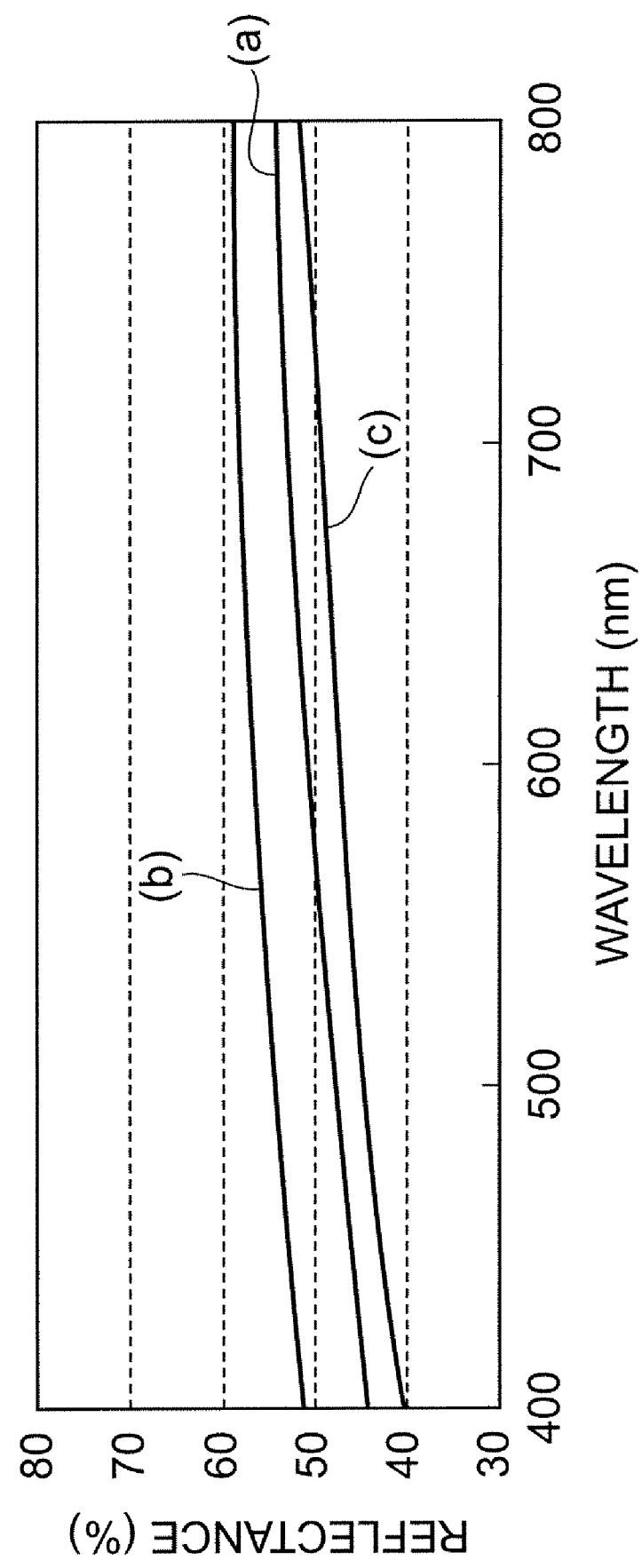
FIG. 2 shows spectral reflection spectra for metallic reflecting films.
Figure 3:
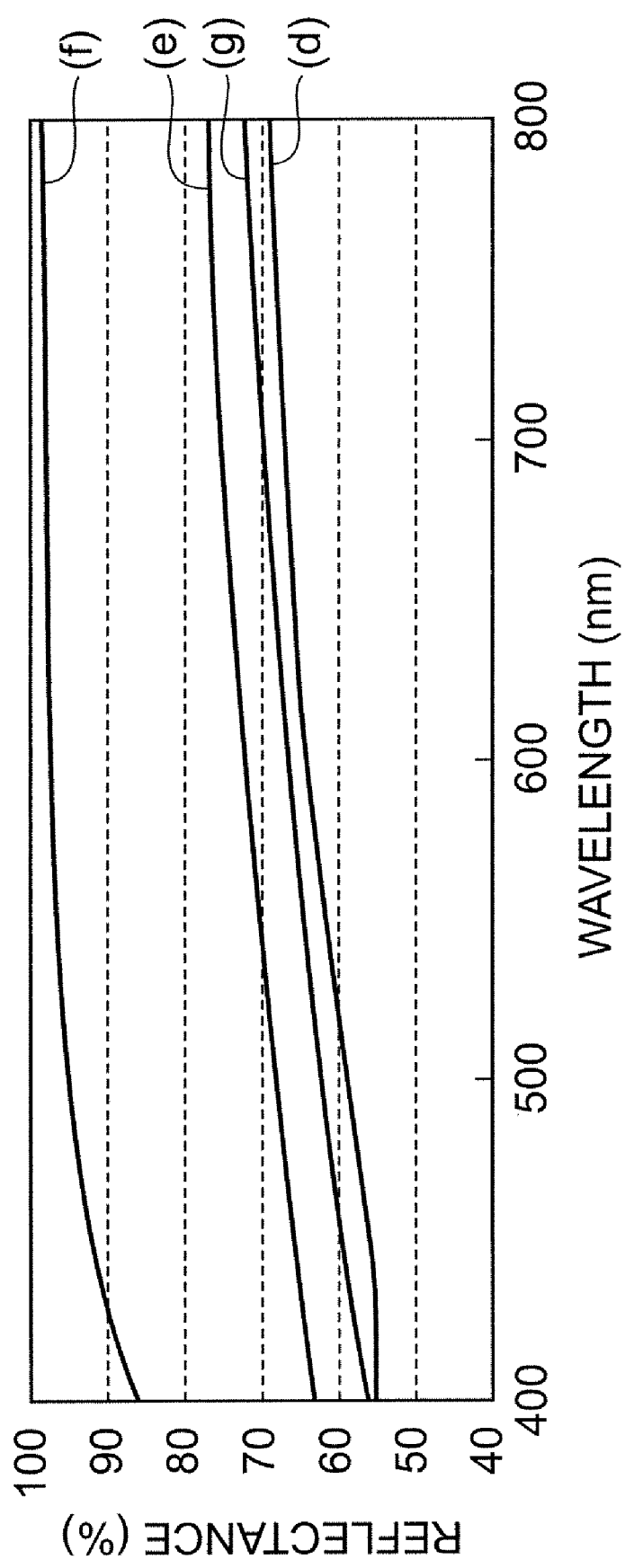
FIG. 3 shows spectral reflection spectra for metallic reflecting films.
Figure 4:
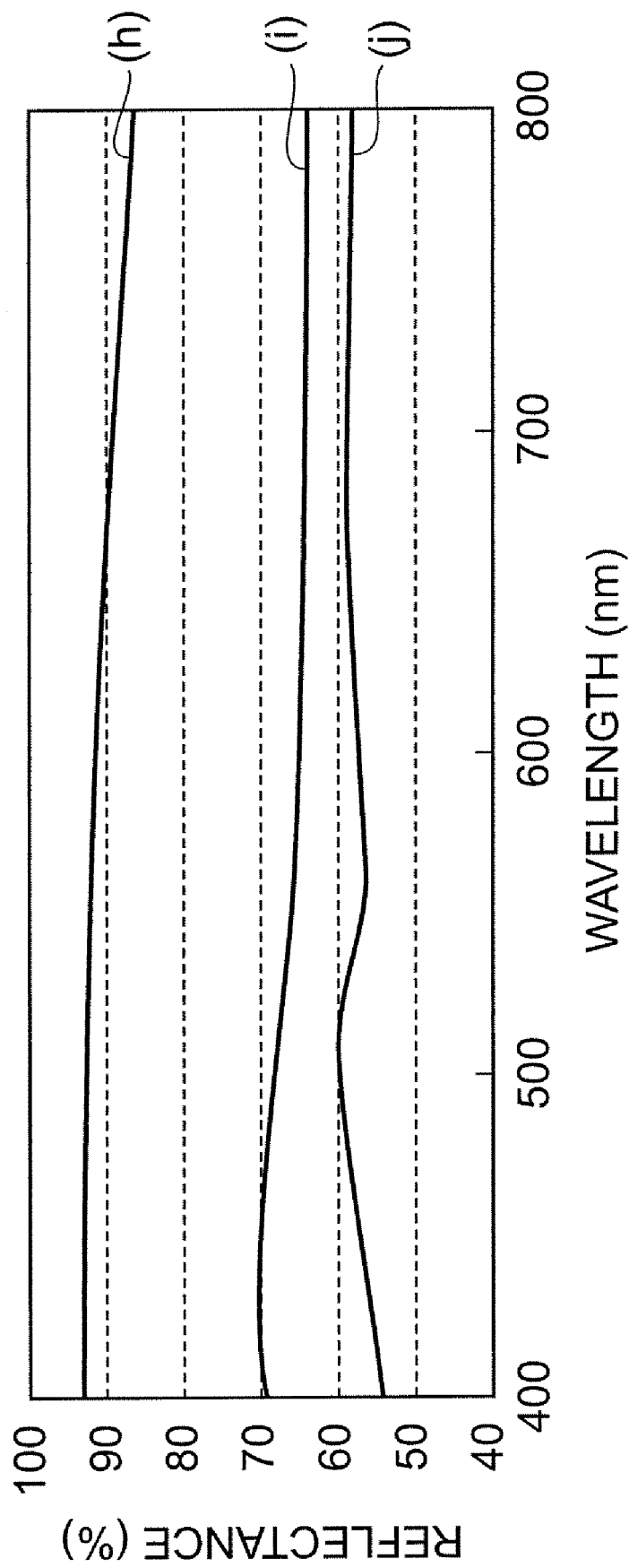
FIG. 4 shows spectral reflection spectra for metallic reflecting films.

FIGS. 2 to 4 show specific examples of the spectral reflection spectra for the above metals and stainless steel. The spectral reflection spectra are shown for titanium, stainless steel, and niobium (film thickness: 60 nm) in (a) to (c) of FIG. 2 respectively, for nickel, palladium, silver, and platinum (film thickness: 15 nm) in (d) to (g) of FIG. 3 respectively, and for aluminum, chromium, and molybdenum (film thickness:

60 nm) in (h) to (j) of FIG. 4 respectively. Unlike for spectral reflection spectra (h) to (j), for spectral reflection spectra (a) to (g), the reflectance increases monotonically from short wavelength to long wavelength over the wavelength region from 400 nm to 800 nm, which is the visible region. If a material exhibiting such a spectral reflection spectrum is used for the metallic reflecting film 14, then the colored anti-fog mirror 10 can be made to have excellent visibility and glare-reducing performance. Moreover, in addition, the colored anti-fog mirror 10 will be able to exhibit a spectral reflection spectrum having a maximum reflectance in the visible region over 510 nm and not more than 600 nm for a broad range of thicknesses of the hydrophilic functional layer 18. This suggests that even in the case that the thickness of the hydrophilic functional layer 18 varies locally, the variation in the color of the mirror surface at these locations will be suppressed, and hence the visibility and the glare-reducing performance will be excellent over the whole of the mirror surface. Moreover, even if the thickness of the hydrophilic functional layer 18 differs between products, variation of the color between the products will be suppressed, indicating that the production reliability (production stability) can be improved. Through the variation in the reflectance being not more than 20%, this tendency is further marked.

Moreover, in contrast with for the spectral reflection spectra (d) to (g), for the spectral reflection spectra (a) to (c), the reflectance is kept within a range of 40 to 60% even though the metallic reflecting film is thick. A material exhibiting such a spectral reflection spectrum is able to prevent well a reduction in contrast of a reflected image which would be caused by excessively high reflectance. With such a material, to obtain a reflected image having suitable contrast, there is thus no need to reduce the reflectance by making the metallic reflecting film 14 into a half mirror. Moreover, there is also an improvement with regard to the problem of the color of the mirror surface varying from place to place due to differences in the film thickness over the metallic reflecting film 14.

The thickness of the metallic reflecting film 14 affects the spectral reflection spectrum of the reflected light from the colored anti-fog mirror 10, albeit less so than do the material of the metallic reflecting film 14 and the thickness of the hydrophilic functional layer 18. From the viewpoint of preventing the colored anti-fog mirror 10 from becoming a half mirror and giving the reflected light a desired spectral reflection spectrum, it is thus preferable to adjust the thickness of the metallic reflecting film 14. The thickness of the metallic reflecting film 14 is preferably in a range of 5 to 100 nm. If this thickness is less than the above-mentioned lower limit, then it will tend to become difficult to adequately prevent the colored anti-fog mirror 10 from becoming a half mirror, whereas even if this thickness is greater than the above-mentioned upper limit, there will be hardly any further change in the reflectance, and hence the material cost and the production cost will merely be increased unnecessarily.

The hydrophilic functional layer 18 comprises the photocatalytic film 16 and the hydrophilic film 17 laminated on in this order from the metallic reflecting film 14 side. The thickness of the hydrophilic functional layer 18 is set in combination with the material of the metallic reflecting film 14 described above such that the reflected light from the colored anti-fog mirror 10 has a spectral reflection spectrum having a maximum reflectance in the visible region over 510 nm and not more than 600 nm, preferably between 515 nm and 570 nm, more preferably between 525 nm and 540 nm. In the present embodiment, the thickness of the hydrophilic functional layer 18, which affects the spectral reflection spectrum of the reflected light from the colored anti-fog mirror 10, is governed mainly by the thickness of the photocatalytic film 16.

The photocatalytic film 16 is a film that is formed on the surface of the metallic reflecting film 14, and contains a photocatalytic substance. There are no particular limitations on the photocatalytic substance so long as this substance exhibits a photocatalytic property. A specific example is at least one selected from the group consisting of titanium dioxide ($TiO_2$), strontium titanate ($SrTiO_3$), tungsten trioxide ($WO_3$), zinc oxide (ZnO), and tin oxide ($SnO_2$). Of these, titanium dioxide is preferable.

In the case that the photocatalytic film 16, which is formed by a DC sputtering method or the like, contains titanium dioxide as the photocatalytic substance, and moreover the metallic reflecting film 14 comprises titanium as the material thereof, both have titanium as a constituent material, and hence the material cost can be reduced.

From the viewpoint of improving both the photocatalytic function and the refractive index with good balance therebetween, the photocatalytic film 16 preferably contains the photocatalytic substance as the main component thereof.

There are no particular limitations on the thickness of the photocatalytic film 16, so long as this thickness is set such that the reflected light from the colored anti-fog mirror 10 has a spectral reflection spectrum satisfying the conditions described above. Nevertheless, this thickness is preferably in a range of 50 to 130 nm. If the thickness of the photocatalytic film 16 is less than the above-mentioned lower limit, then the spectral reflection peak will tend to no longer arise within the visible reflection region, whereas if this thickness is greater than the above-mentioned upper limit, then a plurality of spectral reflection peaks will tend to arise in the visible reflection region, and hence a color overlapping with another color will tend to be exhibited, and the color will tend to vary depending on the viewing angle.

The hydrophilic film 17 is a film formed on the surface of the photocatalytic film 16, and contains a hydrophilic substance so as to exhibit excellent wettability (hydrophilicity) toward water droplets. To obtain good hydrophilicity reliably, the hydrophilic film 17 is preferably porous at least in the vicinity of the surface thereof. There are no particular limitations on the hydrophilic substance so long as this substance exhibits excellent wettability. The hydrophilic substance may be a porous inorganic oxide. Examples of the hydrophilic substance are silicon dioxide ($SiO_2$), and a mixture of diboron trioxide ($B_2O_3$) and silicon dioxide. Silicon dioxide is preferable.

From the viewpoint of the hydrophilic function being exhibited well, the hydrophilic film 17 preferably contains the hydrophilic substance as the main component thereof.

From the viewpoint of the photocatalytic action of the photocatalytic film 16 being exhibited particularly adequately, and the viewpoint of obtaining the desired color, the thickness of the hydrophilic film 17 is preferably in a range of 10 to 50 nm.

Next, an example of a method of manufacturing the colored anti-fog mirror 10 according to the present embodiment will be described. In this manufacturing method, first, a washed substrate 12 is prepared. Next, the metallic reflecting film 14 is formed on the surface of the substrate 12, preferably using a publicly known dry film formation method such as vacuum deposition or sputtering. Then, the photocatalytic film 16 is formed on the surface of the metallic reflecting film 14 and the hydrophilic film 17 is formed on the surface of the photocatalytic film 16 in this order, preferably using a publicly known dry film formation method such as vacuum deposition or sputtering, whereby the colored anti-fog mirror 10 is obtained. Note that in the case that either of the films is made of a plurality of materials, pellets or a sputtering target used as the starting material may be made of these plurality of materials. Alternatively the film may be formed through codeposition using a plurality of types of pellets or sputtering targets each made of a single material.

The colored anti-fog mirror 10 of the present embodiment obtained as described above is able to reduce the light intensity in a reddish long wavelength region when a halogen lamp shines thereon, and moreover the light intensity in the reddish long wavelength region and the light intensity in a strongly blue short wavelength region when a discharge lamp shines thereon, and hence adequate visibility and glare-reducing performance can be secured. Moreover, good glare-reducing performance can be secured even for elderly people who are particularly prone to being dazzled.

Moreover, for the colored anti-fog mirror 10, due to the hydrophilicity of the hydrophilic film 17, water droplets that become attached to the surface thereof spread out into a thin film, and hence excellent anti-fog performance can be obtained. Furthermore, even in the case that organic contaminant that would reduce the hydrophilic function becomes attached to the surface of the anti-fog mirror, the attached organic contaminant is decomposed by the photocatalytic action of the photocatalytic substance contained in the photocatalytic film 16. A reduction in the hydrophilic function of the hydrophilic functional layer 18 can thus be adequately suppressed. As a result, even in wet weather or the like, water droplets that become attached to the surface of the colored anti-fog mirror 10 can be turned into a water film, and hence adequate visibility can be secured.

Moreover, in the case that the colored anti-fog mirror 10 is used as a vehicle mirror, it is generally at dawn and dusk that sunlight is incident on the mirror, the sunlight being colored red at this time. Because the colored anti-fog mirror 10 is able to reduce reflected light in the reddish long wavelength region, even in the case that sunlight is reflected by the mirror, the degree of discomfort felt is less than with a conventional mirror.

Furthermore, the distance between the metallic reflecting film 14 and the mirror surface which could cause a double image is short, and hence a double image perceptible to the human eye can be prevented. Moreover, the hydrophilic functional layer 18 has all of an optical interference action, a hydrophilic action and a photocatalytic action, whereby the structure of the colored anti-fog mirror 10 can be simplified and accompanying this, the manufacturing process can be simplified, and hence the cost can be reduced. Furthermore, through the photocatalytic film 16 and the hydrophilic film 17 being provided separately to one another, the colored anti-fog mirror 10 is able to exhibit the properties and actions of these films at a yet higher level, and hence good anti-fog performance can be maintained over a prolonged period of time.

The colored anti-fog mirror 10 of the present embodiment is preferably used, for example, as an external rear view mirror provided on an automobile, or a road-reflecting mirror. All of these are often used in an environment prone to being exposed to rain or humidity. The hydrophilicity and anti-fog performance of the colored anti-fog mirror 10 can thus be exhibited yet more effectively, and the excellent visibility and glare-reducing performance can be exhibited effectively.

Figure 5:
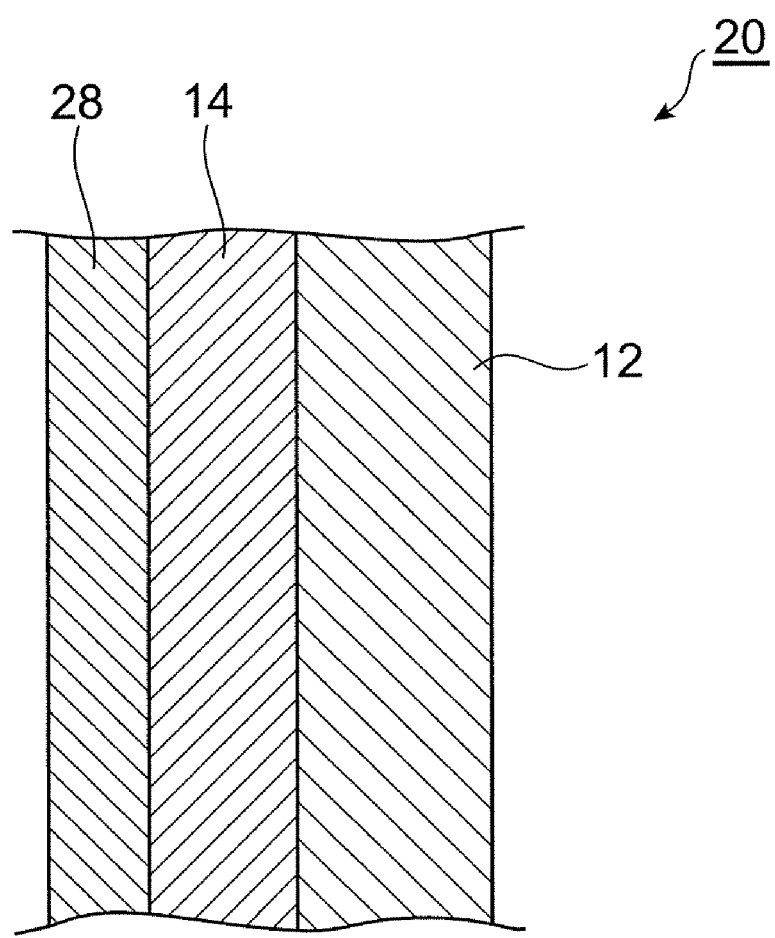
FIG. 5 is a schematic sectional view showing a colored anti-fog mirror according to a second embodiment.
Figure 6:
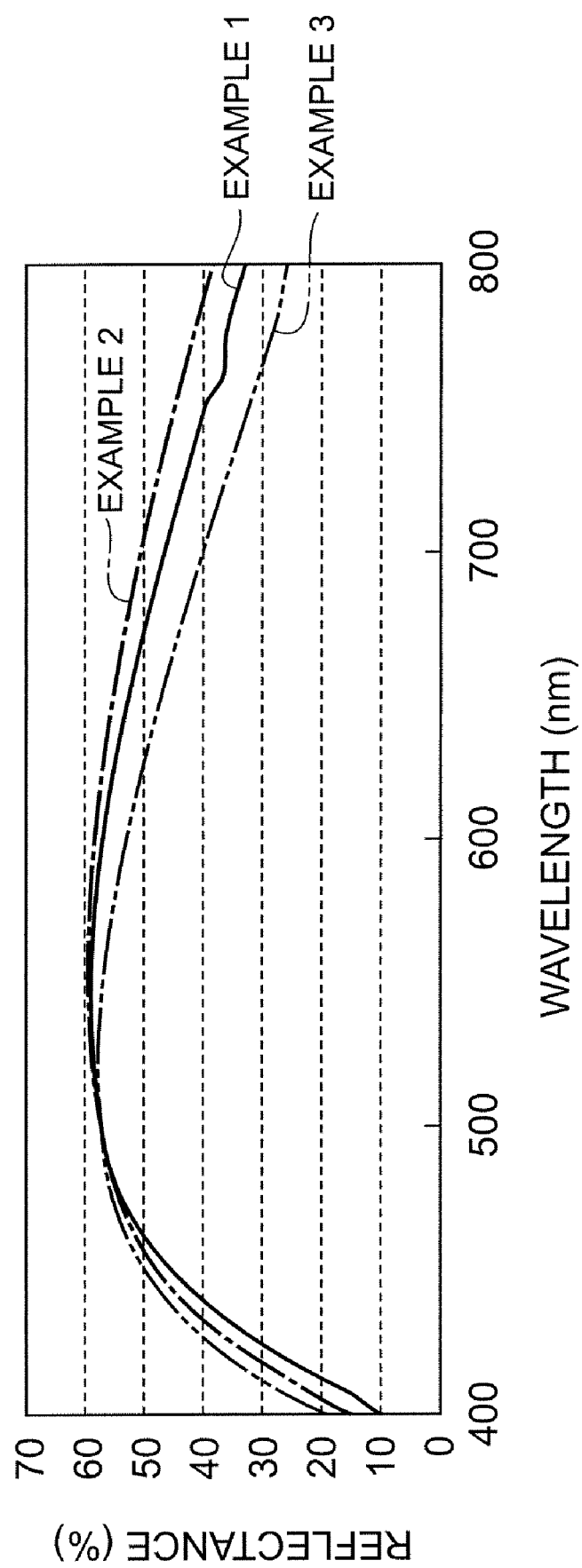
FIG. 6 shows spectral reflection spectra for colored anti-fog mirrors according to examples.
Figure 7:
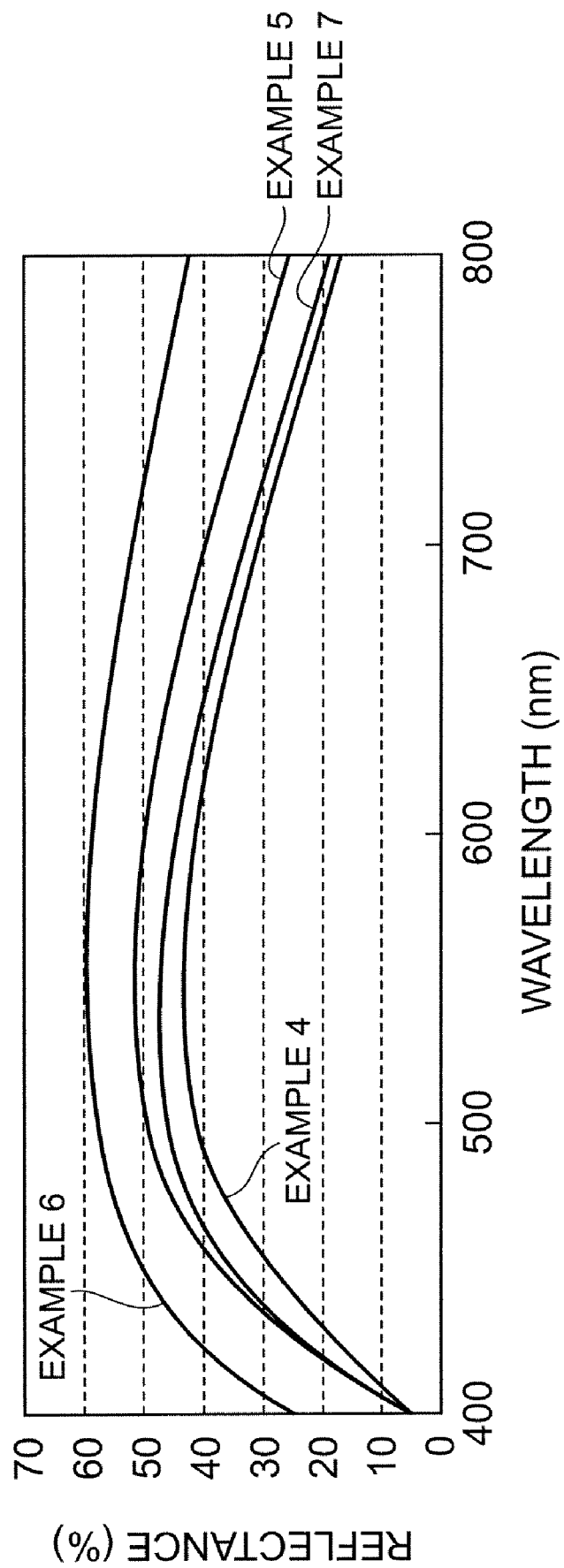
FIG. 7 shows spectral reflection spectra for colored anti-fog mirrors according to examples.
Figure 8:
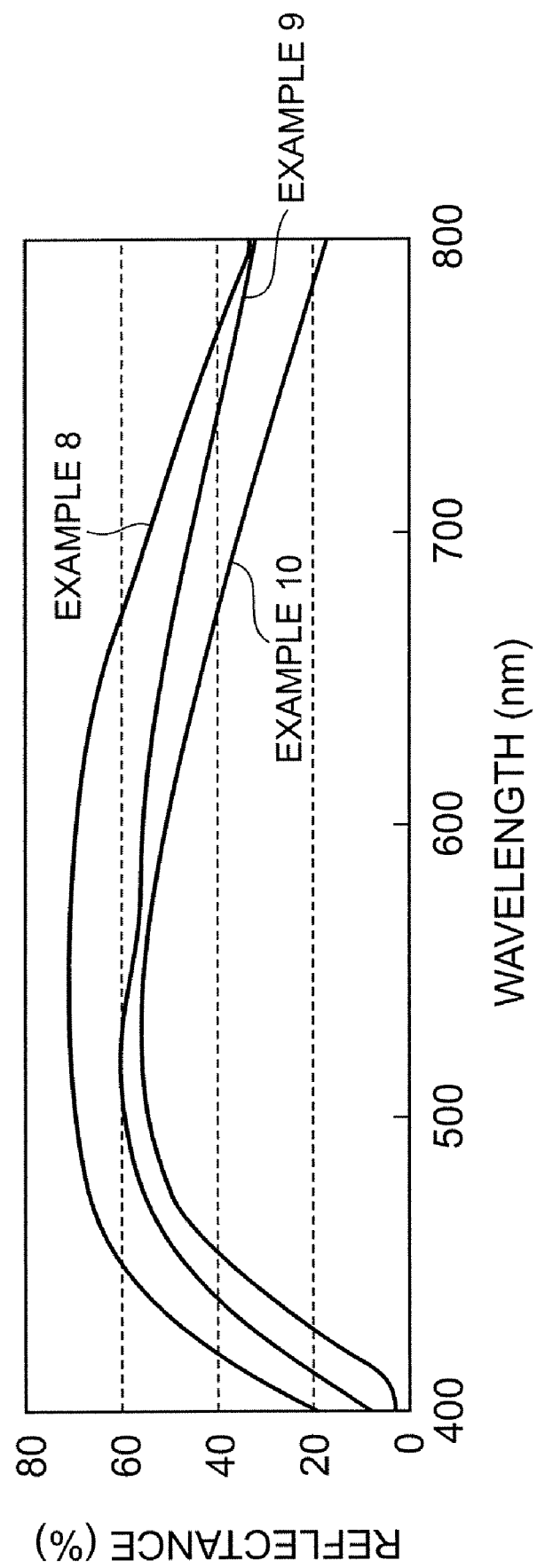
FIG. 8 shows spectral reflection spectra for colored anti-fog mirrors according to examples.

A preferred embodiment of the present invention has been described above, but the present invention is not limited to the above embodiment. FIG. 5 is a schematic sectional view showing a colored anti-fog mirror according to a second embodiment of the present invention. In this colored anti-fog mirror 20, a hydrophilic functional layer 28 comprises a single layer. In this case, the hydrophilic functional layer 28 contains both a hydrophilic substance and a photocatalytic substance, or contains a material that has both a hydrophilic function and a photocatalytic function. In this embodiment, the thickness of the single-layer hydrophilic functional layer 28 is adjusted in combination with the material of the metallic reflecting film 14, being set such that the reflected light has a spectral reflection spectrum having a maximum reflectance in the visible region over 510 nm and not more than 600 nm. According to the colored anti-fog mirror 20 of this embodiment, because the hydrophilic functional layer 28 comprises a single layer, the manufacturing process can be simplified, and hence the cost can be further reduced. Moreover, the total number of films in the colored anti-fog mirror 20 can be reduced, and hence the degree of variation in the color due to variation in film thickness can be reduced, and thus products having a stable color can be manufactured yet more easily. An example of in which both a hydrophilic substance and a photocatalytic substance are contained is a combination of titanium dioxide and silicon dioxide.

Moreover, in yet another embodiment, a reflectance adjusting layer may be provided between the metallic reflecting film and the hydrophilic functional layer. This reflectance adjusting layer is a layer that is provided to increase the reflectance in the case that the reflectance of the metallic reflecting film is low. Examples of the material of the reflectance adjusting layer are aluminum oxide, zirconium oxide, tin oxide, magnesium fluoride, tantalum oxide, and ITO (indium tin oxide).

EXAMPLES

Following is a more detailed description of the present invention through examples. However, the present invention is not limited to these examples.

Example 1

First, a film made of titanium was formed as a metallic reflecting film by sputtering to a thickness of 60 nm on a surface of a glass substrate. Next, a film made of titanium dioxide was provided as a photocatalytic film by vacuum deposition to a thickness of 85 nm on the surface of the metallic reflecting film. A film made of silicon dioxide was then formed as a hydrophilic film to a thickness of 20 nm on the surface of the photocatalytic film, thus obtaining a colored anti-fog mirror having a structure as in FIG. 1.

Examples 2 to 10

Colored anti-fog mirrors of examples 2 to 10 were obtained as in example 1, except that the material of the metallic reflecting film was changed from titanium to niobium, stainless steel, nickel, palladium, silver, platinum, aluminum, chromium, or molybdenum respectively. Here, the thickness of the metallic reflecting film and the thickness of the photocatalytic film were changed as shown in Table 1 below.

Examples 11 to 22

Colored anti-fog mirrors of examples 11 to 14, examples 15 to 18, and examples 19 to 22 were obtained as in examples 1, 2, and 3 respectively, except that the thickness of the metallic reflecting film made respectively of titanium, niobium, or stainless steel in examples 1, 2, and 3 was varied.

Examples 23 to 34

Colored anti-fog mirrors of examples 23 to 25, examples 26 to 28, examples 29 to 31, and examples 32 to 34 were obtained as in examples 1, 2, 3, and 9 respectively, except that the thickness of the photocatalytic film made of titanium dioxide in examples 1, 2, 3, and 9 was varied. The thickness of the photocatalytic film was changed by ±5% centered on that in example 23, 26, 29, or 32 respectively. The thickness of the photocatalytic film in each of these examples is shown in Table 2.

Comparative Example 1

A film made of chromium was formed as a metallic reflecting film by sputtering to a thickness of 60 nm on a surface of a glass substrate, thus obtaining a back surface mirror.

Comparative Example 2

First, a film made of chromium was formed as a metallic reflecting film by sputtering to a thickness of 60 nm on a surface of a glass substrate. Next, a film made of titanium dioxide was provided as a photocatalytic film by vacuum deposition to a thickness of 70 nm on the surface of the metallic reflecting film. A film made of silicon dioxide was then formed as a hydrophilic film to a thickness of 20 nm on the surface of the photocatalytic film, thus obtaining a blue-colored colored anti-fog mirror.

[Measurement of Spectral Reflection Spectra of Mirrors]

For the mirrors of examples 1 to 10 and comparative examples 1 and 2, the spectral reflection spectrum was measured over a wavelength range of 400 nm to 800 nm. As the measurement apparatus, a UV-3150 UV-visible-NIR spectrophotometer (made by Shimadzu Corporation) was used. The results are shown in FIGS. 6 to 8 and 10. Moreover, for each of the examples and comparative examples, the wavelength at which the reflectance was a maximum in the visible region is shown in Table 1.

TABLE 1

|  | Material of metallic reflecting film | Thickness of metallic reflecting film/nm | Thickness of photocatalytic film/nm | Wavelength of maximum reflectance/nm |
| --- | --- | --- | --- | --- |
| Example 1 | Titanium | 60 | 85 | 537 |
| Example 2 | Niobium | 60 | 85 | 545 |
| Example 3 | Stainless steel | 60 | 85 | 517 |
| Example 4 | Nickel | 95 | 95 | 546 |
| Example 5 | Palladium | 95 | 95 | 549 |
| Example 6 | Silver | 75 | 75 | 550 |
| Example 7 | Platinum | 95 | 95 | 536 |
| Example 8 | Aluminum | 10 | 95 | 536 |
| Example 9 | Chromium | 15 | 105 | 530 |
| Example 10 | Molybdenum | 60 | 100 | 517 |
| Co. Exam. 1 | Chromium | 60 | — | No peak |
| Co. Exam. 2 | Chromium | 60 | 70 | 433 |

[Evaluation of Relationship Between Thickness of Photocatalytic Film (Hydrophilic Functional Layer) and Wavelength of Maximum Reflectance]

Figure 9:
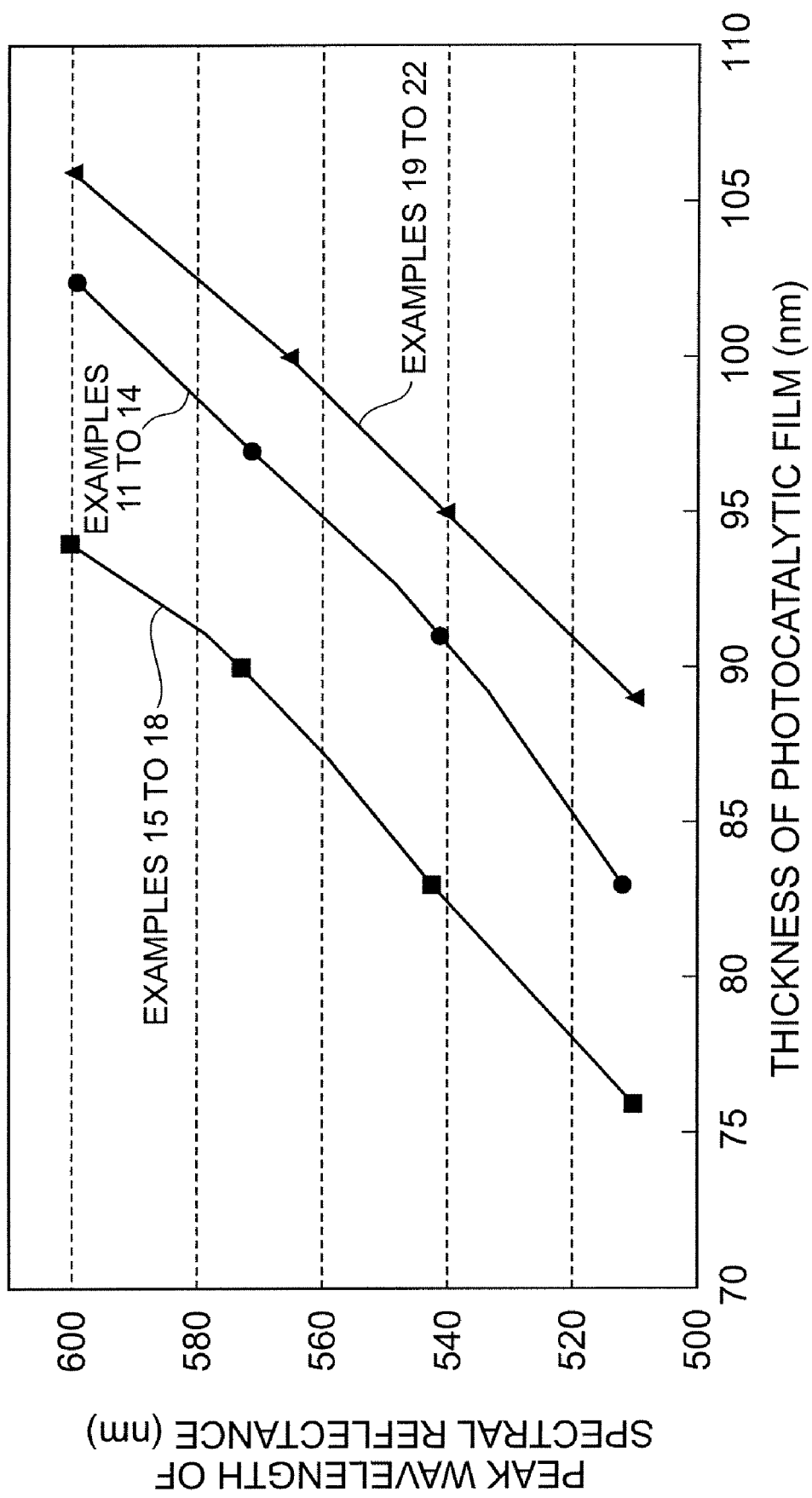
FIG. 9 is a plot showing the relationship between the thickness of a photocatalytic film and the wavelength at which the reflectance is a maximum for colored anti-fog mirrors according to examples.
Figure 10:
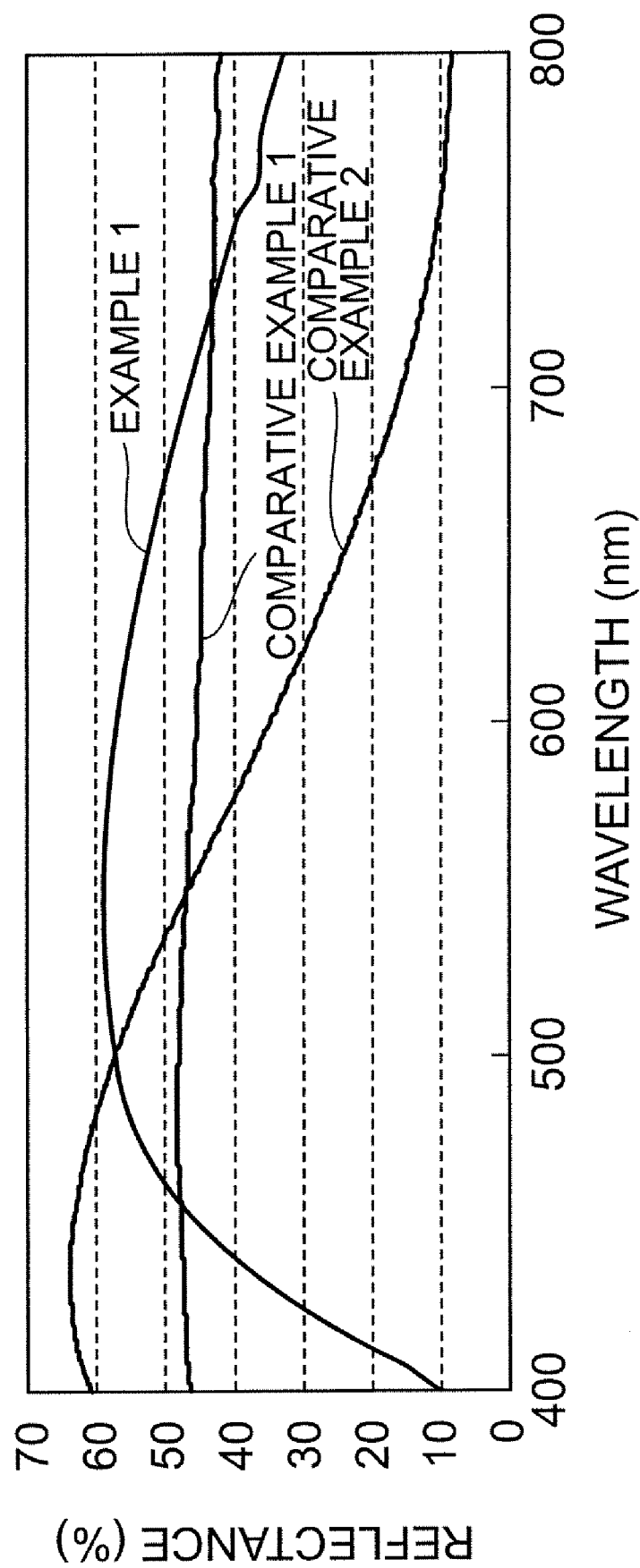
FIG. 10 shows spectral reflection spectra for mirrors according to an example and comparative examples.

For the colored anti-fog mirrors of examples 11 to 22, the spectral reflection spectrum was measured over a wavelength range of 400 nm to 800 nm using the same measurement apparatus as above. The maximum value of the reflectance was read off from each of the spectra obtained, and the relationship between the wavelength here and the thickness of the photocatalytic film was investigated. A plot in which the thickness of the photocatalytic film is plotted on the x-axis and the wavelength at which the reflectance is a maximum (the peak wavelength of spectral reflectance) on the y-axis is shown in FIG. 9. From FIG. 9, it is clear there is a strong correlation between the wavelength at which the reflectance is a maximum and the thickness of the photocatalytic film.

[Evaluation of Variation in Color with Thickness of Photocatalytic Film (Hydrophilic Functional Layer)]

For the colored anti-fog mirrors of examples 23 to 34, the color was measured using a CM-2002 spectral colorimeter (made by Konica Minolta). The results are shown in Table 2.

TABLE 2

|  | Thickness of photocatalytic film/nm | Color coordinates (CIE) | | |
| --- | --- | --- | --- | --- |
|  |  | L* | a* | b* |
| Example 23 | 90 | 81.1 | −7.7 | 6.2 |
| Example 24 | 86 | 80.7 | −7.6 | 1.2 |
| Example 25 | 95 | 81.2 | −8.3 | 13.7 |
| Example 26 | 90 | 81.9 | −6.3 | 20.3 |
| Example 27 | 86 | 82.5 | −5.8 | 13.9 |
| Example 28 | 95 | 80.6 | −6.5 | 29.7 |
| Example 29 | 95 | 82.1 | −8.2 | 8.5 |
| Example 30 | 90 | 82.2 | −9.2 | 18.1 |
| Example 31 | 105 | 81.4 | −8.0 | 4.9 |
| Example 32 | 100 | 78.4 | −13.5 | 7.2 |
| Example 33 | 95 | 77.4 | −13.6 | 5.0 |
| Example 34 | 105 | 77.8 | −15.2 | 26.8 |

As is clear from Table 2, by using a reflecting film for which the reflectance increases monotonically from short wavelength to long wavelength over the wavelength region from 400 nm to 800 nm, which is the visible region, in the case that a photocatalytic film is provided on the reflecting film, even if the thickness of the photocatalytic film varies, there is little change in the color.

[Evaluation of Hydrophilicity]

The colored anti-fog mirror of each of examples 1 and 2 was irradiated for 24 hours with UV radiation of intensity 1.0 mW/cm$^2$. A water droplet was then dropped onto the mirror surface, and the contact angle was measured. The result was that the contact angle of the water droplet was not more than 5° for both examples.

[Evaluation of Weather Resistance]

For the colored anti-fog mirror of each of examples 1 and 2, a weather resistance test was carried out as stipulated in JIS-D0205 using a weather resistance tester as stipulated in JIS-B7754. The test time was made to be 1000 hours. Next, after the test, the colored anti-fog mirror was irradiated for 24 hours with UV radiation of intensity 1.0 mW/cm². A water droplet was then dropped onto the mirror surface, and the contact angle was measured. The result was that the contact angle of the water droplet was not more than 5° for both examples. Moreover, for each colored anti-fog mirror used in the evaluation of the weather resistance, even after the irradiation with UV radiation, no change in the appearance such as discoloration or peeling were observed, and furthermore good hydrophilicity was exhibited.

[Evaluation of Corrosion Resistance]

For the colored anti-fog mirror of each of examples 1 and 2, a corrosion resistance test was carried out as stipulated in JIS-Z2371. The test time was made to be 240 hours. Next, after the test, the colored anti-fog mirror was irradiated for 24 hours with UV radiation of intensity 1.0 mW/cm². A water droplet was then dropped onto the mirror surface, and the contact angle was measured. The result was that the contact angle of the water droplet was not more than 5° for both examples. Moreover, for each colored anti-fog mirror used in the evaluation of the corrosion resistance, even after the irradiation with UV radiation, no change in the appearance such as discoloration or peeling were observed, and furthermore good hydrophilicity was exhibited.

[Evaluation of Acid Resistance]

For the colored anti-fog mirror of each of examples 1 and 2, an acid resistance test was carried out by immersing for 24 hours in a 10% purified sulfuric acid solution in accordance with JIS-K1321. The test time was made to be 1000 hours. Next, after the test, the colored anti-fog mirror was irradiated for 24 hours with UV radiation of intensity 1.0 mW/cm². A water droplet was then dropped onto the mirror surface, and the contact angle was measured. The result was that the contact angle of the water droplet was not more than 5° for both examples. Moreover, for each colored anti-fog mirror used in the evaluation of the acid resistance, even after the irradiation with UV radiation, no change in the appearance such as discoloration or peeling were observed, and furthermore good hydrophilicity was exhibited.

[Evaluation of Visibility, and Discomfort Due to Reflection of Sunlight]

First, one test subject in each age group from 20s to 60s was selected. Next, each test subject sat in the driver's seat of an automobile equipped with an external rear view mirror comprising the mirror according to one of example 1 and comparative examples 1 and 2. It was then evaluated whether or not the test subject could see well an object viewed via the external rear view mirror at night. The case that the object could be seen well was taken as "A", and the case that the object could not be seen well as "B". Moreover, it was evaluated whether or not the test subject felt discomfort in the case of glancing sunlight via the external rear view mirror. The case of not feeling any discomfort at all was taken as "A", the case of feeling a little discomfort as "B", and the case of feeling strong discomfort as "C". The results are shown in Table 3.

TABLE 3

|  | Age of test subject | Example 1 | Co. Exam. 1 | Co. Exam. 2 |
| --- | --- | --- | --- | --- |
| Visibility | 20s | A | A | A |
|  | 30s | A | A | A |
|  | 40s | A | A | A |
|  | 50s | A | A | A |
|  | 60s | A | A | A |
| Discomfort due to reflection of sunlight | 20s | A | C | B |
|  | 30s | A | C | B |
|  | 40s | A | C | B |
|  | 50s | A | C | B |
|  | 60s | A | C | B |

[Evaluation of Glare-Reducing Performance]

First, one test subject in each age group from 20s to 60s was selected. Next, each test subject sat in the driver's seat of an automobile A equipped with an external rear view mirror comprising the mirror according to one of example 1 and comparative examples 1 and 2. Meanwhile, another automobile B was placed behind the automobile A in which the test subject was seated such that the headlamps of the automobile B shone onto the automobile A. It was then evaluated whether or not the test subject felt unpleasantly dazzled in the case of glancing at the shining headlamps of the automobile B via the external rear view mirror of the automobile A at night. The case of not feeling unpleasantly dazzled at all was taken as "A", the case of feeling a little dazzled as "B", and the case of feeling strongly dazzled as "C". This evaluation was carried out for the cases of the headlamps of the automobile B being each of halogen lamps and discharge headlamps. The results are shown in Table 4.

TABLE 4

|  | Age of test subject | Example 1 | Co. Exam. 1 | Co. Exam. 2 |
| --- | --- | --- | --- | --- |
| Halogen lamps | 20s | A | C | A |
|  | 30s | A | C | A |
|  | 40s | A | C | A |
|  | 50s | A | C | A |
|  | 60s | A | C | A |
| Discharge head lamps | 20s | A | C | B |
|  | 30s | A | C | B |
|  | 40s | A | C | B |
|  | 50s | A | C | B |
|  | 60s | A | C | B |

What is claimed is:

1. A colored anti-fog mirror that reflects incident light to emit reflected light, the colored anti-fog mirror comprising:
    a substrate;
    a hydrophilic functional layer containing a photocatalytic substance; and
    a metallic reflecting film provided between said substrate and said hydrophilic functional layer;
    wherein a material of said metallic reflecting film and a thickness of said hydrophilic functional layer are set such that said reflected light has a spectral reflection spectrum having a maximum reflectance in a visible region over 510 nm and not more than 600 nm.

2. The colored anti-fog mirror according to claim 1, wherein said hydrophilic functional layer comprises
    a hydrophilic film containing a hydrophilic substance, and
    a photocatalytic film containing a photocatalytic substance provided on the metallic reflecting film side of said hydrophilic film.

3. The colored anti-fog mirror according to claim 2, wherein said hydrophilic substance comprises silicon dioxide, and said photocatalytic substance comprises titanium dioxide.

4. The colored anti-fog mirror according to claim 1, wherein said metallic reflecting film has a spectral reflection spectrum in which the reflectance increases monotonically from short wavelength to long wavelength over the whole visible region.

5. The colored anti-fog mirror according to claim 2, wherein said metallic reflecting film has a spectral reflection spectrum in which the reflectance increases monotonically from short wavelength to long wavelength over the whole visible region.

6. The colored anti-fog mirror according to claim 3, wherein said metallic reflecting film has a spectral reflection spectrum in which the reflectance increases monotonically from short wavelength to long wavelength over the whole visible region.

7. The colored anti-fog mirror according to claim 4, wherein the reflectance of said metallic reflecting film with a thickness of 60 nm varies by not more than 20% over a wavelength region from 400 nm to 800 nm.

8. The colored anti-fog mirror according to claim 5, wherein the reflectance of said metallic reflecting film with a thickness of 60 nm varies by not more than 20% over a wavelength region from 400 nm to 800 nm.

9. The colored anti-fog mirror according to claim 6, wherein the reflectance of said metallic reflecting film with a thickness of 60 nm varies by not more than 20% over a wavelength region from 400 nm to 800 nm.

10. The colored anti-fog mirror according to claim 4, wherein said metallic reflecting film comprises titanium and/or niobium.

11. The colored anti-fog mirror according to claim 5, wherein said metallic reflecting film comprises titanium and/or niobium.

12. The colored anti-fog mirror according to claim 6, wherein said metallic reflecting film comprises titanium and/or niobium.

13. The colored anti-fog mirror according to claim 7, wherein said metallic reflecting film comprises titanium and/or niobium.

14. The colored anti-fog mirror according to claim 8, wherein said metallic reflecting film comprises titanium and/or niobium.

15. The colored anti-fog mirror according to claim 9, wherein said metallic reflecting film comprises titanium and/or niobium.

16. The colored anti-fog mirror according to claim 1, used as a vehicle mirror.

17. The colored anti-fog mirror according to claim 2, used as a vehicle mirror.

18. The colored anti-fog mirror according to claim 3, used as a vehicle mirror.

19. The colored anti-fog mirror according to claim 4, used as a vehicle mirror.

20. The colored anti-fog mirror according to claim 7, used as a vehicle mirror.

* * * * *